United States Patent [19]

Ryczek

[11] Patent Number: 4,513,343

[45] Date of Patent: Apr. 23, 1985

[54] SHORT CIRCUIT PROTECTOR HAVING FOLD-BACK TRIP POINT FOR SOLID STATE SWITCHING DEVICE

[75] Inventor: Lawrence J. Ryczek, Nashotah, Wis.

[73] Assignee: Eaton Corporation, Cleveland, Ohio

[21] Appl. No.: 453,206

[22] Filed: Dec. 27, 1982

[51] Int. Cl.³ .............................................. H02H 3/08
[52] U.S. Cl. ..................... 361/101; 361/18; 361/93
[58] Field of Search ............... 361/18, 58, 59, 71, 361/74, 91, 93, 98, 101; 307/560, 567; 323/276, 277

[56] References Cited

U.S. PATENT DOCUMENTS

| 3,390,306 | 6/1968 | White | 361/74 |
| 3,517,264 | 6/1970 | Anderson, Jr. | 361/59 |
| 3,638,102 | 1/1972 | Pelka | 323/9 |
| 3,851,218 | 11/1974 | York | 361/101 |
| 4,271,448 | 6/1981 | Pond | 361/93 |

FOREIGN PATENT DOCUMENTS 2316182 10/1974 Fed. Rep. of Germany ........ 361/18

Primary Examiner—Harry E. Moose, Jr.

Attorney, Agent, or Firm—C. H. Grace; L. G. Vande Zande

[57] ABSTRACT

A transistor circuit (18) is series connected with a solid state switching device (14) and a load (4) controlled by that device (14) to protect that device (14) from overcurrents resulting from short circuits such as across the load (4). The transistor circuit (18) detects the overcurrent and switches to a high impedance state in response to that detection. The circuit (18) is self-resettable to restore to the low impedance state each half-cycle of applied voltage, thereby to automatically restore the switching device (14) to normal operation immediately upon removal of the short, and is set to initially respond to a level of current sufficiently high to preclude switching in response to inrush currents. Initial switching of the circuit (18) to its high impedance state latches a reduced level detection circuit (R1-R2-Q4) in the transistor circuitry (18) whereby the latter switches to its high impedance state upon detecting lower overcurrent values for each successive half-cycle until the short is removed. The predictability of the response range for the circuit, especially in the reduced level voltage detection mode, is improved by placing a resistor (R5) in series with the control switching transistor (Q3) for the circuit.

5 Claims, 7 Drawing Figures

SHORT CIRCUIT PROTECTOR HAVING FOLD-BACK TRIP POINT FOR SOLID STATE SWITCHING DEVICE

BACKGROUND OF THE INVENTION

This invention relates to short circuit protectors for electronic switches such as proximity switches. More particularly, this invention relates to a short circuit protector which is self-resettable upon each half-cycle of applied voltage.

Transistor circuits which function as a current limiting protective device for electronic switching devices such as target sensing solid state proximity switches are known. The protective circuit is connected in series with the load and the solid state switch and under normal conditions, operates in a low impedance state. Upon overload fault conditions, such as a short circuit across the load, the protective circuit switches to a high impedance state to limit the current flowing to the protected solid state switch. In one form, protective devices of the aforementioned type remain latched in the high impedance state until the power to the device is removed or dropped below some predetermined value. This resetting action normally requires that a workman determine and locate the fault condition and then perform some specific resetting operation.

Protective circuits of the aforementioned type which are automatically, or self-resettable, are also known. These circuits sense the short circuit on each half-cycle and repeatedly switch to the high impedance state when the amplitude of the sensed overcurrent reaches the trip point for the protective circuit. The repeated application of high currents to the protective circuit consumes a significant amount of power and can cause damage to the protective circuit due to the heat generated by the dissipation of this power.

SUMMARY OF THE INVENTION

The present invention provides overcurrent protection for a solid state switch such as a target sensing solid state proximity switch. The invention is embodied in a transistor circuit connected in series with the solid state switch, the transistor circuit switching from a low impedance state to a high impedance state when current therein exceeds a predetermined value, thereby to limit the current flowing to the solid state switch. The protective transistor circuit is automatically, or self-resettable to return to its low impedance state upon removal of the fault condition, and therefore resets to the low impedance state and senses the current in each half-cycle. The protective transistor circuit of this invention features a fold-back trip point, i.e., the current level at which the circuit switches from its low to high impedance state, wherein the trip point is lowered after the circuit initially switches to its high impedance state to thereafter switch to the high impedance state upon sensing only a fraction of the overcurrent on subsequent half-cycles until the fault is removed, thereby reducing power consumption in the protective circuit while providing automatic resetting upon removal of the fault condition. This circuit also provides improved predictability of the fold-back trip point ranges.

DESCRIPTION OF THE PREFERRED EMBODIMENT

Figure 1:
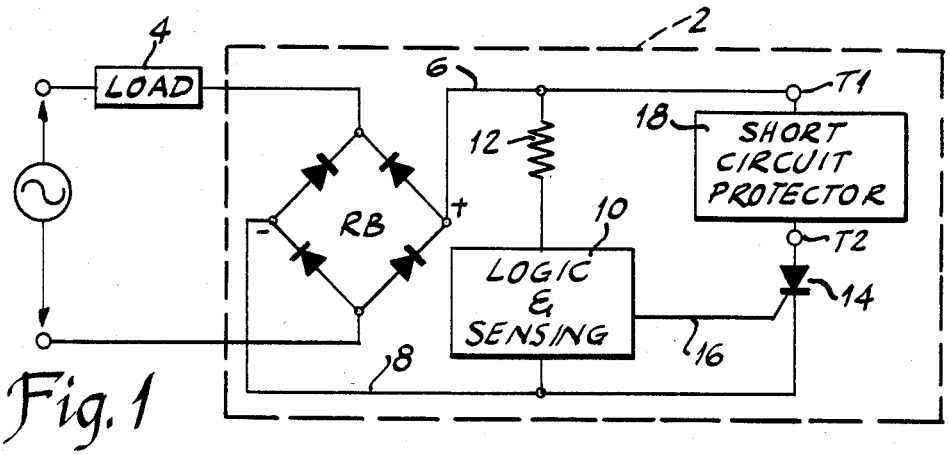
FIG. 1 is a schematic diagram of a control circuit for a solid state proximity switch incorporating the short circuit protector of this invention.

Referring to FIG. 1, a target-sensing solid state proximity switch 2, represented by the broken line rectangle, is connected in an AC circuit in series with a load 4 to be controlled by the proximity switch 2. The proximity switch includes a full wave rectifier bridge RB which provides the switch with rectified full wave DC current over conductors 6 and 8. A logic and sensing circuit 10 is connected in series with a current limiting device such as resistor 12 between the conductors 6 and 8. A solid state switch 14 is also connected between the conductors 6 and 8 in parallel with the logic and sensing circuit 10, the switch 14 being controlled by the output of the logic and sensing circuit 10 through a conductor 16. Switch 14 is protected against high short circuit currents by the short circuit protector 18 of this invention which has terminals T1 and T2 series connected between the conductor 6 and the anode of switch 14. In operation a target, such as an object on a moving conveyor, is sensed by the logic and sensing circuit 10 which causes a control signal to be applied to the solid state switch 14 through conductor 16 to cause the switch 14 to switch into its conductive state, thereby completing a circuit to the load 4.

Figure 2:
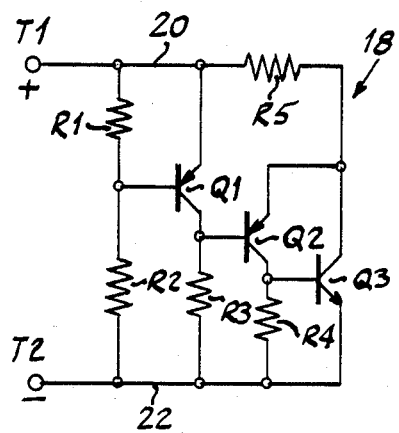
FIG. 2 is a schematic diagram of one form of short circuit protector.
Figure 3:
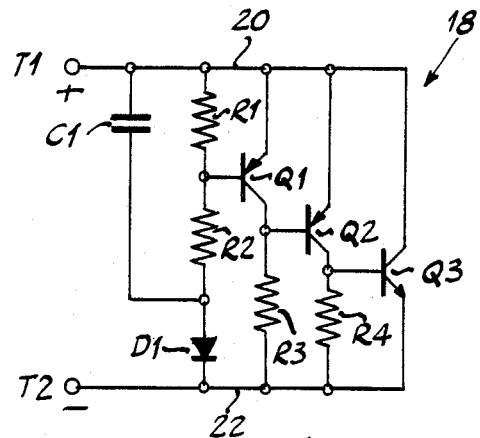
FIG. 3 is a schematic diagram of another form of short circuit protector.
Figure 4:
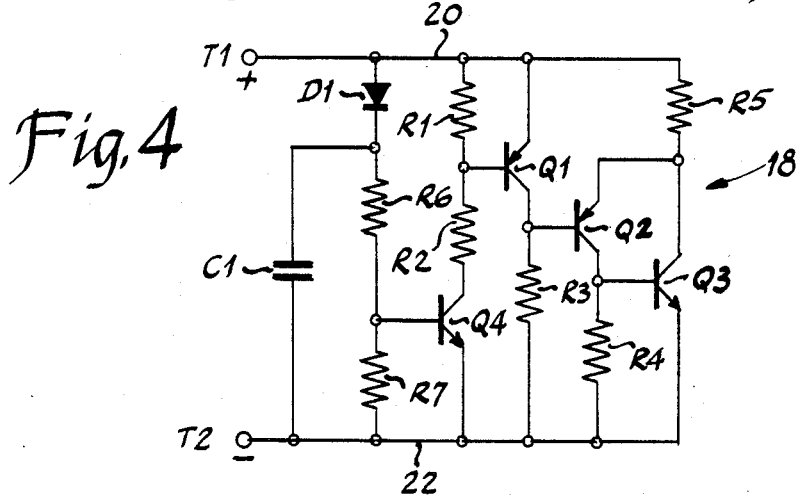
FIG. 4 is a schematic diagram showing the short circuit protector of this invention.

Short circuit protector 18 is a transistor circuit which operates in a low impedance state under normal conditions and switches to a high impedance state upon detecting currents in excess of a predetermined value to limit the current to switch 14. FIGS. 2 and 3 of the drawings illustrate short circuit protectors incorporating transistor circuits similar to that employed in the protector of this invention. The embodiment of FIG. 2 provides a short circuit protector that is self-resettable on each half-cycle of applied voltage, and which switches to the high impedance state when a fixed overcurrent trip point is reached in each half-cycle. The embodiment of FIG. 3 provides a short circuit protector that latches in the high impedance state upon initial tripping of the circuit and which remains in that state until the supply voltage is removed. The short circuit protector of this invention is illustrated in FIG. 4 and operates to switch the transistor circuit to a high impedance state upon detecting an overcurrent that reaches a first predetermined value, then resets itself on each half-cycle to repeatedly sample the current on successive half-cycles, but lowers the trip point for such successive half-cycles to cause the circuit to switch to its high impedance state upon detecting a lesser magnitude of overcurrent. To facilitate the description and a comparison of the circuits shown in FIGS. 2 through 4, the same reference characters will be utilized throughout to identify like elements.

Referring particularly to FIG. 2, a DC potential is applied to the terminals T1 and T2. Conductors 20 and 22 are connected to the terminals T1 and T2, respectively. At the right-hand end of the transistor circuit shown in FIG. 2, a compound transistor comprising a PNP transistor Q2 and NPN transistor Q3, together with resistors R3 and R4, are connected between the lines 20 and 22. Current flowing in the line 20 when the solid state switch such as 14 is turned on will flow immediately through the emitter-base circuit of transistor Q2 and the resistor R3 to line 22 to turn on transistor Q2, thereby completing a circuit through transistor Q2 and resistor R4. The latter provides base-emitter current flow through the transistor Q3 to turn that transistor on, thereby establishing a current path through the collector-emitter path of transistor Q3 to the line 22 to present a low impedance path through the transistor circuit between terminals T1 and T2. In the event of a short circuit across the load 4, a high current will be present in the line 20 which will generate an increased voltage drop across the transistor Q3. As the voltage across transistor Q3 increases the voltage at the intermediate junction of a voltage divider provided by series connected resistors R1 and R2 between the lines 20 and 22 increases to cause current flow through the emitter-base of transistor Q1 and resistor R2 sufficient to turn transistor Q1 on. Conduction of transistor Q1 establishes a current path from line 20 through the emitter-collector of transistor Q1 and resistor R3 to line 22, thereby shunting transistor Q2 to turn the latter off which then turns off transistor Q3. When transistor Q3 turns off, the voltage between terminals T1 and T2 increases rapidly to drive transistor Q1 further into conduction, thereby establishing a positive feedback once transistor Q1 begins to turn on. Transistor Q1 will turn off as the voltage at terminals T1 and T2 goes through zero, thereby resetting the circuit of FIG. 2 to its low impedance state. However, any short circuit remaining on the load circuit will be applied to the transistor circuit on each successive half-cycle, and the circuit of FIG. 2 will sense the overcurrent to the full tripping value as determined by the voltage divider R1-R2 on each successive half-cycle before turning the transistor Q3 off and switching to its high impedance state. This operation consumes a significant amount of power and generates a considerable amount of heat which could be damaging to the protective circuit itself. The current flow established through transistor Q1 and resistor R2 in the high impedance state is of a small value which will not damage the solid state switching device 14. A resistor R5 may be connected in series with the compound transistor Q2-Q3 for reasons to be described hereinafter.

The short circuit protector shown in FIG. 3 is similar to that shown in FIG. 2 but is modified to provide a latching function to hold the circuit in its high impedance state once it has detected an overcurrent. A diode D1 is added in series with the voltage divider comprising resistors R1 and R2 across the lines 20 and 22. A capacitor C1 is connected in parallel with the resistors R1 and R2 from the line 20 to the point common between resistor R2 and diode D1. The circuit of FIG. 3 functions in the manner as described in conjunction with that shown in FIG. 2, however when the voltage across transistor Q3 and therefore the voltage at the intermediate junction of voltage divider R1-R2 becomes sufficiently large to establish a current flow through the emitter-base Q1 and resistor R2, the capacitor C1 becomes charged through diode D1. As the full wave DC current goes through zero, capacitor C1 discharges through the emitter-base junction of Q1 to hold Q1 on so that the circuit latches in its high impedance state. This circuit will remain latched in the high impedance state, even after the short is removed, until a specific resetting function is performed to drop or remove the voltage at terminals T1-T2.

Figure 5:
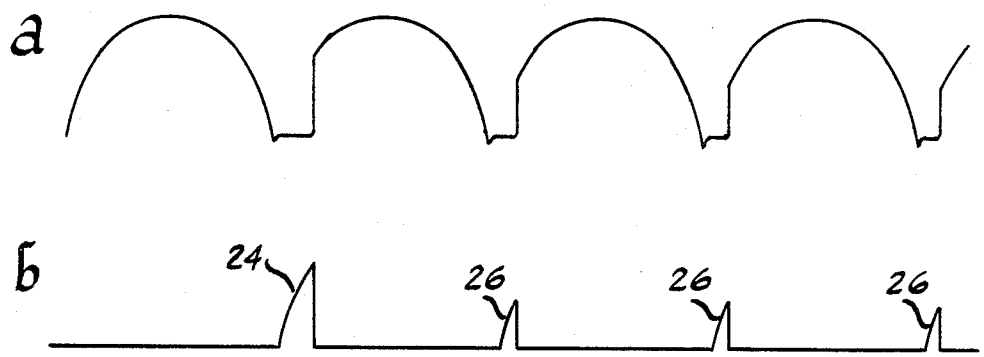
FIGS. 5a,b are wave form graphs showing the voltage and current, respectively, applied to the short circuit protector of this invention during an over-current fault condition.

Referring now to FIG. 4, the transistor circuit comprising the short circuit protector of this invention is disclosed. A fourth transistor Q4 is provided in this circuit having its collector-emitter path connected in series between resistor R2 and the line 22 in the location of diode D1 in FIG. 3. The diode D1 is connected in series with an additional voltage divider resistor pair R6 and R7 between the lines 20 and 22, the point common between resistor R6 and R7 being connected to the base of transistor Q4. Capacitor C1 herein is connected between the point common between diode D1 and resistor R6 and the line 22. In operation, the short circuit protector of FIG. 4 operates as previously described when an initial voltage is applied to the terminals T1-T2 to turn the transistors Q2 and Q3 on, thereby immediately completing a low impedance circuit path to the switching device 14. Upon the occurrence of a short circuit across load 4, the overcurrent develops a voltage across transistor Q3 to establish an increased voltage across the terminals T1-T2. The ratio of voltage divider resistors R6 and R7 is chosen such that a base-emitter voltage on transistor Q4 will not reach a value sufficient to turn that transistor on until the voltage across Q3 indicates that a predetermined maximum current value has been exceeded. When such current level has been reached and a voltage is developed across transistor Q3, and therefore at terminals T1-T2, and the intermediate junction of the voltage divider R6-R7 to cause transistor Q4 to turn on, the completed circuit through resistors R1, R2 and transistor Q4 establishes a voltage at the intermediate junction of voltage divider R1-R2 which establishes a current path through the emitter-base of transistor Q1, resistor R2 and the collector-emitter of transistor Q4 to turn transistor Q1 on which then shunts the compound transistor Q2-Q3 to turn it off and cause the transistor circuit to switch to its high impedance state. Capacitor C1 charges during the period in which transistor Q4 is turned on and discharges through the base-emitter path of transistor Q4 when the voltage at rectifier bridge RB goes to zero to hold transistor Q4 on. This effectively latches the transistor Q4 on and maintains the voltage divider R1-R2 connected in the circuit. The ratio of resistors R1 and R2 are chosen to provide a lower trip point than that provided by the voltage divider R6-R7 whereby applications of over-current during subsequent successive half-cycles will be detected by the voltage build up across transistor Q3 until a voltage level adequate to turn on transistor Q1 as described in conjunction with FIG. 3 is reached. As previously stated, the trip point established by the voltage divider R1-R2 is less than that established by the voltage divider R6-R7 and thus the protective circuit of FIG. 4 trips out at a lower value of current for each succeeding half-cycle during which the over-current condition exists. This operation is depicted by the wave form graphs of FIG. 5, wherein FIG. 5a shows the voltage at terminals T1 and T2 and FIG. 5b, shows the corresponding current at terminals T1 and T2. It will be seen that the first half-cycle during which an overload current is present, voltage divider R6-R7 permits the current to reach a first magnitude as shown at 24, thereby accommodating any inrush currents that might be present. However, upon detecting an over-current condition sufficient to initially trip the circuit to its high impedance state, a new trip point is established by latching a new voltage divider R1-R2 into the circuit which causes the circuit to trip when a significantly lower current as shown at 26 is reached on successive half-cycles.

Figure 6:
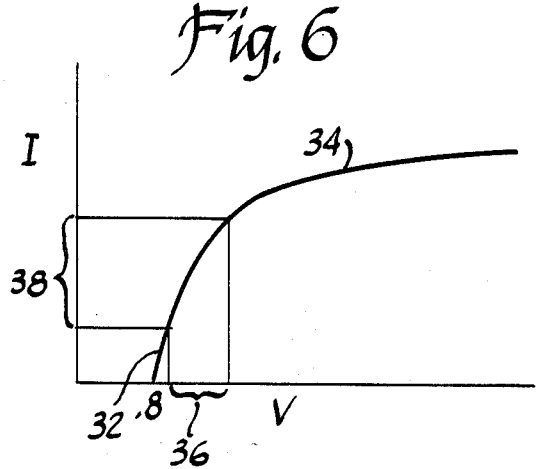
FIG. 6 is a current-voltage curve for the tripping transistor of the short circuit protector of this invention without a trip point regulating feature.
Figure 7:
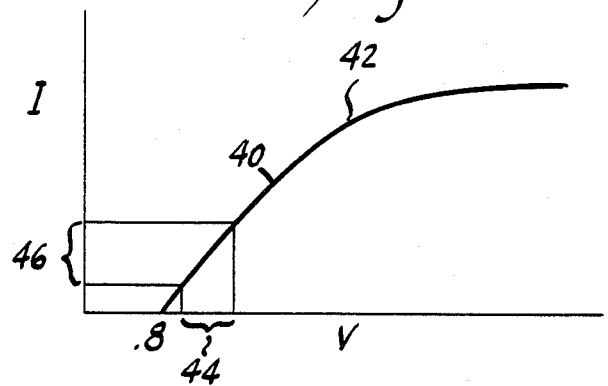
FIG. 7 is a similar current-voltage curve for the tripping transistor of the short circuit protector of this invention when a trip point regulating feature is incorporated therein.

Referring again to FIGS. 2 and 4, a resistor R5 is connected in series with the compound transistor Q2-Q3 between conductors 20 and 22. This addition provides improved predictability of the current levels at the trip point or the fold-back trip point of the respective circuits, and will be described further in conjunction with the curves shown in FIGS. 6 and 7. In FIG. 6, the output curve of the compound transistor Q2-Q3 is shown. The compound transistor is set to begin to turn on at approximately 0.8 volts and it turns on sharply at that point, resulting in a steep initial slope 32 which smoothly tapers off to a flat curve 34 as the transistor Q3 comes out of saturation. The circuit initially trips at a voltage level set sufficiently high by voltage divider R6-R7 to avoid tripping in response to inrush currents. Accordingly, the initial trip point voltage level is set in the relatively flat portion 34 of the curve, and the magnitude of the corresponding current when the predetermined voltage is reached is very predictable within a small range. On subsequent half cycles the circuit responds at a lower voltage level set by the voltage divider R1-R2 which occurs in the steep portion 32 of the curve. It may be seen in FIG. 6 that a narrow voltage range 36 in the lower voltage portion of the curve provides a wide range 38 for the corresponding current. FIG. 7 shows the output curve of the compound transistor Q2-Q3 when the resistor R5 is connected in series therewith. The resistor produces a linear, reduced slope 40 for the graph at the initial conduction portion until the transistor comes out of saturation at the knee 42 whereupon the remaining portion of the curve is identical to that of FIG. 6. In the embodiment graphed in FIG. 7, the initial trip point occurs in the flat portion of the graph as described in conjunction with FIG. 6, and current magnitude predictability is not a problem. For the reduced voltage level trip point however, it can be seen that a voltage range 44, made the same as range 36, produces a much narrower corresponding current range 46, and therefore affords greater predictability of the current level at which the circuit will trip to its high impedance state in the fold-back trip point range.

The transistor circuit for current limiting short circuit protection having fold-back trip point for a solid state switch of this invention has been described in the foregoing in a preferred embodiment. However, it is to be understood that this invention is not intended to be limited to that particular embodiment and that it is susceptible of various modifications without departing from the scope of the appended claims.

I claim:

1. An overcurrent protection circuit for limiting current flow to a solid state switching device connected in series with said circuit, a load controlled by said switching device, and a full wave rectified DC source, said circuit comprising, in combination:

means rendering said circuit conductive in a low impedance state upon application of DC power to said circuit;

first detection means for sensing current in said circuit and causing said circuit to switch to a high impedance state when said current exceeds a first predetermined value and for connecting a second detection means in said circuit, said second detection means being responsive to a second predetermined current value less than said first predetermined current value for causing said circuit to switch to said high impedance state;

means switching said circuit to said low impedance state at the end of each half-cycle of DC power applied to said circuit; and capacitor means for maintaining said second detection means connected in said circuit for subsequent successive half-cycles until said current does not exceed said second predetermined value.

2. An overcurrent protection circuit for limiting current flow to a solid state switching device connected in series with said circuit, a load controlled by said switching device, and a full wave rectified DC source, said circuit comprising, in combination:

a pair of terminals;

first transistor means connected across said terminals and driven into conduction upon the application of DC power to said terminals for switching said circuit to a low impedance state;

means for sensing current in said circuit and for generating a voltage across said terminals proportionate to said current;

first voltage detection means connected across said terminals;

second voltage detection means and second transistor means connected in series across said terminals;

third transistor means connected across said terminals;

said second transistor means driven into conduction in response to a first predetermined voltage at said first voltage detection means for connecting said second voltage detection means into said circuit;

said third transistor means driven into conduction in response to a second predetermined voltage less than said first predetermined voltage at said second voltage detection means for rendering said first transistor means non-conductive thereby switching said circuit to a high impedance state, said circuit switching to said low impedance state at the end of each half-cycle of DC power applied to said terminals; and capacitor means for maintaining said second transistor means conductive during subsequent successive half-cycles following said switching of said circuit to a high impedance state thereby to maintain said second voltage detection means connected in said circuit until said voltage does not reach said second predetermined value.

3. The invention defined in claim 2 further comprising resistor means connected in series with said first transistor means for linearizing the early turn-on portion of said first transistor means, thereby to improve the predictability of the current level in said circuit corresponding to said second predetermined voltage.

4. The invention defined in claim 2 wherein said solid state switching device is a proximity limit switch operable to control an AC load device.

5. The invention defined in claim 1 wherein said means rendering said circuit conductive in a low impedance state comprises transistor means connected across said D.C. power, and further comprising resistor means connected in series with said transistor means across said D.C. power for linearizing the early turn-on portion of said transistor means, thereby to improve the predictability of said second current level.

* * * * *